Jan. 30, 1962 W. E. BARRE ET AL 3,018,575
TRANSPARENCY PREVIEWER
Filed Nov. 19, 1959 2 Sheets-Sheet 1
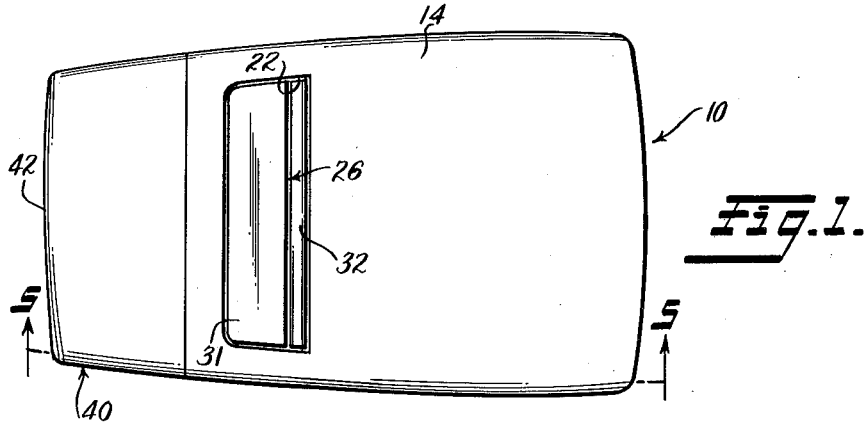
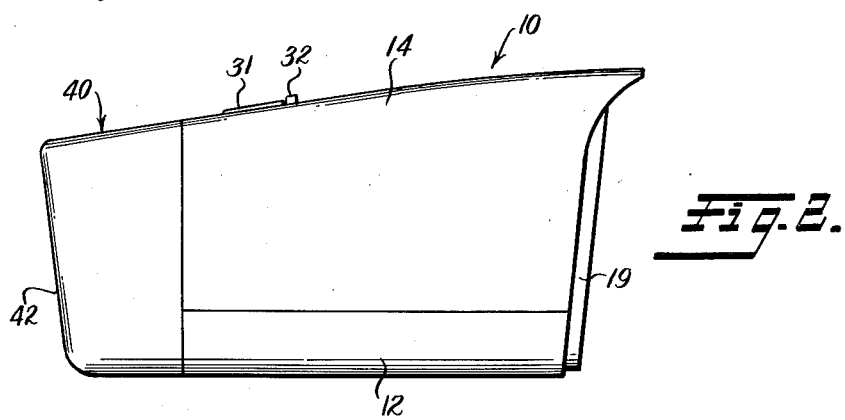
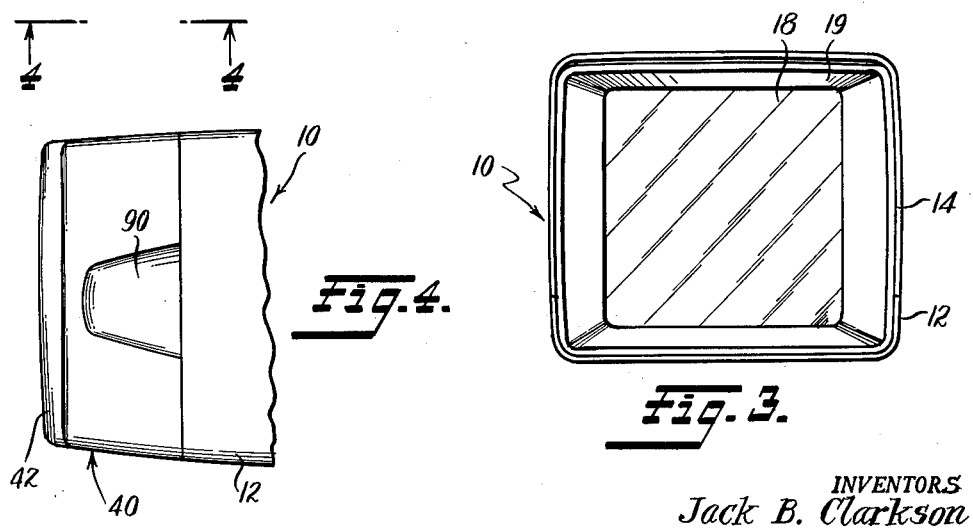
INVENTORS
Jack B. Clarkson
Wade E. Barre
BY Michael Hertz,
ATTORNEY

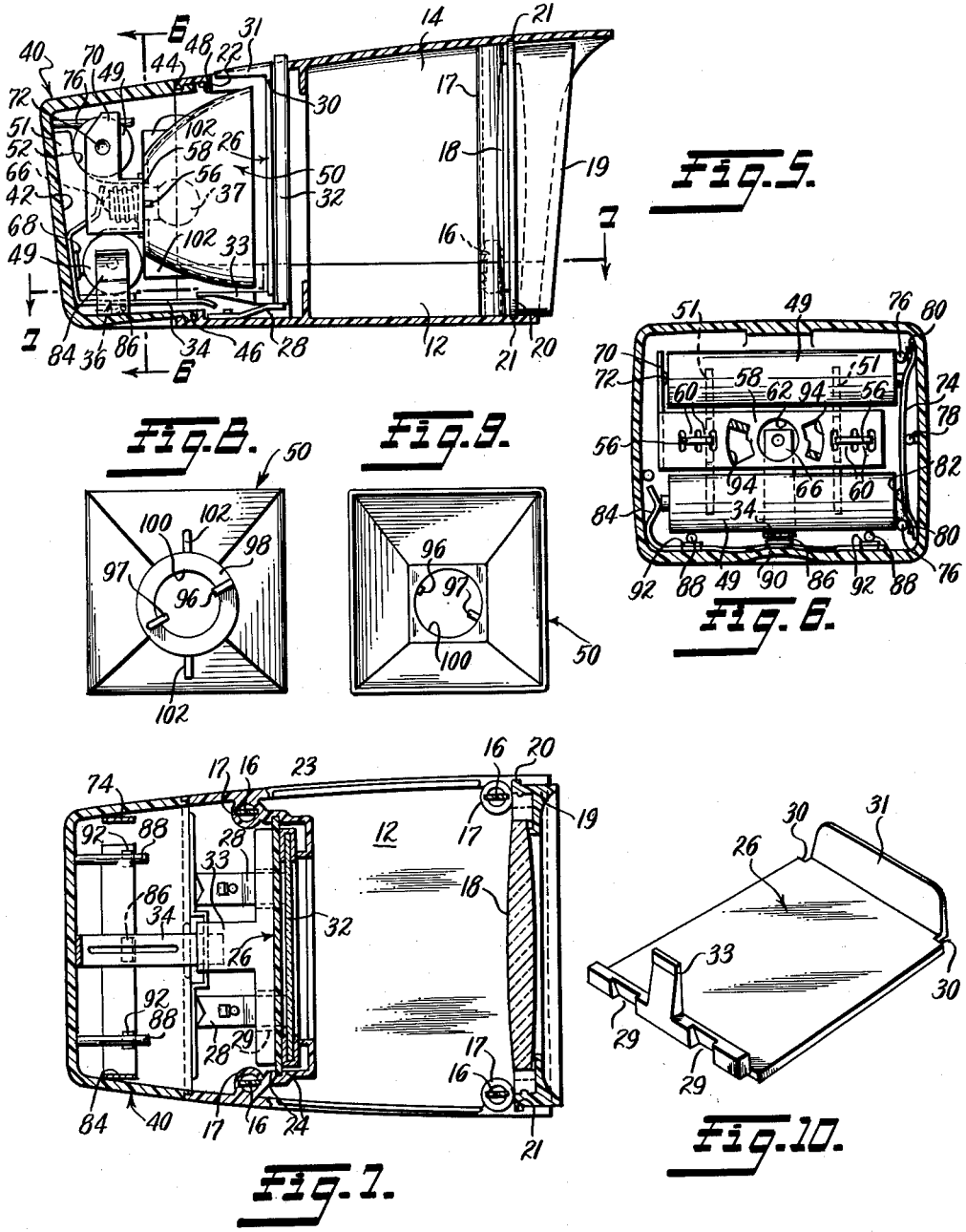

3,018,575
TRANSPARENCY PREVIEWER

Wade E. Barre and Jack B. Clarkson, Warren, Pa., assignors to Sylvania Electric Products Inc., a corporation of Delaware
Filed Nov. 19, 1959, Ser. No. 854,157
10 Claims. (Cl. 40—63)

This invention relates to an improved previewer with self contained light source for viewing photographic transparencies and in particular to such a previewer in which the transparency may be viewed even in the event of failure of the self contained light source.

In the prior art where previewers are provided with an internal light source it is not possible with simple viewer construction to adequately view the transparencies when the light source within the previewer failed.

It is therefore an object of this invention to provide a simple previewer with means enabling the viewing of a transparency in the event of failure of its self contained light source.

It is another object of the invention to provide easy means for energizing the self contained light source whether the transparency be bound in a rigid frame or not.

It is a further object of the invention to provide an improved means for holding battery cells in place within a cap of a previewer and particularly when the cap is detached from the remainder of the previewer.

These and other objects will become apparent upon consideration of the following specification when taken in conjunction with the accompanying drawings in which:

FIG. 1 is a top view of the previewer.
FIG. 2 is a side elevation thereof.
FIG. 3 is a front view of the previewer.
FIG. 4 is a fragmental view of the previewer looking at its bottom.
FIG. 5 is a vertical elevation of the previewer as it would appear with a side wall removed.
FIG. 6 is a section on the line 6—6 of FIG. 5.
FIG. 7 is a section on the line 7—7 of FIG. 5.
FIG. 8 is a rear view of a reflector.
FIG. 9 is a front view thereof, and
FIG. 10 is a perspective view of a light diffusion plate.

Referring to the drawings with greater particularity, at 10 is indicated a two part tubing as of plastic material consisting of a lower tubing section 12 and an upper tubing section 14 held together by any conventional means as the serrated double ended self locking nails 16, see FIGS. 5 and 7, set in hollow posts 17 integral with the tubing sections. At the front end of the tubing is positioned a magnifying lens 18 frictionally held in a frame 19, flanges 20 of the frame being held in slots 21 in the inner walls of the tubing. At the rear of the tubing, in the upper wall 14, there is provided a through slot 22 transverse to the longitudinal axis of the tubing. The tubing is generally rectangular in cross section and integral with each of the vertical walls of the tubing and in vertical alignment with the through slot 22 is a slideway 23, see FIG. 7, formed by a pair of guide rails 24 and in which slideway there slides the vertical edges of a light diffusion plate 26, preferably made of plastic material.

Fastened to the lower wall of the tubing is a pair of cantilever leaf springs 28, these extending longitudinally of the tubing with the free ends of the springs extending in a horizontal plane below and forwardly across the vertical plane of the cross slot. The lower edge of the diffusion plate 26 rests on these springs with the springs lying in lower edge slots 29, see FIG. 10, and the plate is urged upwardly by these springs until shouldered portions 30 on the upper edge of the plate engage the upper closed ends of the slideways. At this time the upper edge of the plate is substantially flush with the upper surface of the top tubing section or just slightly thereabove to facilitate the sliding of the finger of an operator holding the viewer across the top overhanging ledge 31 of the plate so that the plate can be readily depressed. For this purpose, too, the top ledge of the plate has a considerable extent in the longitudinal direction of the tubing. The through cross slot has a dimension in the direction of the longitudinal axis of the tubing sufficient to freely accommodate the thickness of a slide or transparency 32 which may be dropped in front of the diffusion plate and come to rest on the free ends of the springs. At this time the upper edge of the transparency will ordinarily project above the surface of the tubing, but this is unimportant with the instant construction as will be developed. Integral with the rear of the diffusion plate and the lower edge thereof is a projection 33 to operate a leaf spring 34 of a switch 36 for lighting a bulb 37 behind the diffusion plate. Upon depression of the diffusion plate the projection 33 will depress the spring 34 to close the switch. Upon release of the diffusion plate it will be lifted by the springs 28 and the switch will open. The projection 33 lies within the boundaries of the tubing section and does not extend therebeyond so that it may not be broken off in the event the transparency is used with the cap, hereinafter described, removed and with an external source of illumination. The diffusion plate may be depressed by the finger of the operator operating on the upper edge of the diffusion plate. Even a non rigid transparency may be dropped through the slot 22 and viewed with the aid of the built-in light source since the diffusion plate and not the transparency is operated to close the light circuit.

To the rear of the tubing is snap fitted a cap 40, see FIG. 5, having a bottom 42, shouldered lips 44 and snap hooks 46 to engage in recesses 48 in inner walls of the tubing. The cap is sufficiently resilient to permit the hooks to snap past the edges of the recesses 48 and seat in the recesses and the cap may be removed by pressing the sides of the cap together near the hooks and pulling the cap away from the tubing.

Within the cap is located the light bulb 37, the switch 36, therefor, and clips to hold battery cells 49 in series with the switch and light bulb. Also the mounting for the bulb detachably supports a combined battery hold down and reflector 50 for the bulb. Upstanding from the bottom of the cap are two walls 51, see FIGS. 5 and 6, the lower ends of which are arcuate as indicated at 52, FIG. 6, to support the cells 49 and the upper end of which is formed with projections 56 to receive, in lock nut fashion, lamp carrying bar 58, the bar having tongues 60 sprung to engage the sides of the projections 56. Threaded through an opening 62 in the bar is the lamp 37, the lamp base making electrical contact with the bar, and the central bottom contact of the lamp making contact with a spring contact 66 held to the base by tongues, similar to tongues 60 on bar 58, sprung to engage the sides of a projection 68 upstanding from the base of the cap, in lock nut fashion. The lamp contact 66 just described is integral with the spring 34. The bar 58 has an integral spring portion 70 extending laterally therefrom adapted to engage one pole of a battery cell and preferably provided with a dimple 72 to engage the negative outer pole of the cell. To complete the circuit between the parts, a battery cross bar 74 is provided sprung in behind two posts 76 upstanding from the base and resiliently engaging the face of a third post 78 web connected to a side of the cap. To prevent accidental withdrawal of the bar 74, it is provided with spring tongues 80 to bite into the post 76 on attempted withdrawal of the bar from the cap. The bar 74 further may be provided with a dimple 82 to engage the second cell 49 of the battery. The remaining contact spring 84 for the battery is integral with contact 86, the latter being bent up from a portion of the spring, and the spring is held in place in the cap much like the bar 74. For this purpose the cap has two upstanding posts 88 and the double contact member 84, 86 is sprung behind these posts and over a bulge 90 in the cap. The spring contact besides having the bent out contact 86 to be engaged by leaf spring contact 34 also has tongues 92 to bite into the posts 88 upon attempted withdrawal of the double ended contact member.

The reflector 50 is connected to the lamp carrying bar 58 by a bayonet joint consisting of two arcuate cutouts 94 in the bar, shaped as shown, and two hooks 96 and 97 extending from the base 98 of the reflector. The hooks 96, 97 are of different lengths and the cutouts in the bar are of such contour that the reflector can fit only one way on the bar. The reflector is provided with a hole 100 to enable the reflector to be slid over a bulb already mounted in the cap and is further provided with rearward projections 102 centrally above the length of the battery cells to prevent them from falling out of the battery contacts or clips, especially upon sudden movements such as those due to detachment of the cap from the remainder of the previewer. The reflector is not quite symmetrical with respect to a horizontal axis passing through FIGS. 8 and 9 but is foreshortened at the bottom to provide space for the rearwardly extending actuator 31 on the diffusion plate, as can be seen in FIG. 5. The differences in the two bayonet slots and hooks enforce the proper positioning of the reflector on the bar.

In operation, the lamp bulb and battery cells and reflector are mounted in the cap and then the cap is snapped into the tubular portion of the previewer and which contains the lens diffusion plate and the springs 28 for supporting the diffusion plate and the transparency 32 which may be placed in the previewer. When the operator's fingers glide over the top ledge of the diffusion plate it can be depressed by the fingers against the force of springs 28 to cause the projection 33 to close the switch 36. Thereupon the bulb 37 is operative and the reflector 50 effectively illuminates the diffusion plate 26 so that the transparency can be viewed.

Should the internal light of the previewer fail for any reason, the cap, together with its switch, battery, lamp and reflector can be readily detached from the tubing, leaving the lens, transparency slot and diffusion plate intact so that the viewer can be used with extraneous sources of light such as sunlight or other bright light source.

What is claimed is:
1. A transparency viewing device comprising a tubing having a lens at one end thereof, the tubing having a transverse slot on its upper side and near the end thereof remote from the lens, a light diffusing plate within said tubing at said remote end, the upper edge of which is movable in said slot, spring means below the plate reacting between the tubing and plate to project the upper edge of the plate through the slot, said slot being wide enough to accommodate a transparency with the lower end of the transparency resting on the spring means, and a cap detachably secured to said remote end of the tubing, said cap having mounted therein a source of illumination, a switch for the same and a reflector for said source, and a part on the light diffusion plate engageable with the switch to close the same on depression of the plate.

2. A transparency viewing device comprising a tubing having a lens at one end thereof, the tubing having a transverse slot on its upper side and near the end thereof remote from the lens, a light diffusing plate within said tubing at said remote end, the upper edge of which is movable in said slot, spring means below the plate reacting between the tubing and plate to project the upper edge of the plate through the slot, said slot being wide enough to accommodate a transparency with the lower end of the transparency resting on the spring means, and a cap detachably secured to said remote end of the tubing, said cap having mounted therein a source of illumination, a switch for the same having a contact spring extending toward the diffusion plate, and a reflector for said source, and a projection on the light diffusion plate extending over the contact spring and engageable therewith to close the switch on depression of the plate.

3. A transparency viewing device comprising a tubing having a lens at one end thereof, the tubing having a transverse slot on its upper side and near the end thereof remote from the lens, a light diffusing plate within said tubing at said remote end, the upper edge of which is movable in said slot, spring means below the plate reacting between the tubing and plate to project the upper edge of the plate through the slot, said slot being wide enough to accommodate a transparency with the lower end of the transparency resting on the spring means, and a cap detachably secured to said remote end of the tubing, said cap having mounted therein a source of illumination, a switch for the same having a contact spring extending beyond the cap and toward the diffusion plate and into the tubing, and a reflector for said source, and a projection on the light diffusion plate wholly within the confines of the tubing and extending over the contact spring and engageable therewith to close the switch on depression of the plate.

4. A transparency viewing device comprising a tubing having a lens at one end thereof, the tubing having a transverse slot on its upper side and near the end thereof remote from the lens, a light diffusing plate within said tubing at said remote end, the upper edge of which is movable in said slot, spring means below the plate reacting between the tubing and plate to project the upper edge of the plate through the slot, said slot being wide enough to accommodate a transparency with the lower end of the transparency resting on the spring means, and a cap detachably secured to said remote end of the tubing, said cap having mounted therein a source of illumination, a battery and a switch for the same and a reflector for said source, readily detachable connections between the reflector and the cap, and a part on the light diffusing plate engageable with the switch to close the same on depression of the plate.

5. A transparency viewing device comprising a tubing having a lens at one end thereof, the tubing having a transverse slot on its upper side and near the end thereof remote from the lens, a light diffusing plate within said tubing at said remote end, the upper edge of which is movable in said slot, spring means below the plate reacting between the tubing and plate to project the upper edge of the plate through the slot, said slot being wide enough to accommodate a transparency with the lower end of the transparency resting on the spring means, and a cap detachably secured to said remote end of the tubing, said cap having mounted therein a source of illumination, a battery and a switch for the same and a reflector for said source, a projection on the reflector engaging the battery to prevent its falling out of the cap, and a part on the light diffusing plate engageable with the switch to close the same on depression of the plate.

6. A transparency viewing device comprising a tubing having a lens at one end thereof, the tubing having a transverse slot on its upper side and near the end thereof remote from the lens, a light diffusing plate within said tubing at said remote end, the upper edge of which is movable in said slot, spring means below the plate reacting between the tubing and plate to project the upper edge of the plate through the slot, said slot being wide enough to accommodate a transparency with the lower end of the transparency resting on the spring means, and a cap detachably secured to said remote end of the tubing, said cap having mounted therein a source of illumination, a battery and a switch for the same and a reflector for said source, readily detachable means between the reflector and cap, a projection on the reflector engaging the battery to prevent its falling out of the cap and a part on the light diffusing plate engageable with the switch to close the same on depression of the plate.

7. A transparency viewing device comprising a tubing having a lens at one end thereof, the tubing having a transverse slot on its upper side and near the end thereof remote from the lens, a light diffusing plate across said tubing at said remote end, the upper edge of which is movable in said slot, spring means within the tubing below the plate reacting between the tubing and plate to project the upper edge of the plate through the slot to a height substantially flush with the upper side of the tubing, said slot being wide enough in the direction of the length of the tubing to further accommodate a transparency with the lower end of the transparency resting on the spring means, and a cap detachably secured to said remote end of the tubing, said cap having mounted therein a source of illumination, a switch for the same and a reflector for said source, and a part on the light diffusing plate engageable with the switch to close the same on depression of the plate.

8. A transparency viewing device comprising a tubing having a lens at one end thereof, the tubing having a transverse slot on its upper side and near the end thereof remote from the lens, a light diffusing plate within said tubing at said remote end, the upper edge of which is movable in said slot, spring means below the plate reacting between the tubing and plate to project the upper edge of the plate through the slot, said slot being wide enough to accommodate a transparency with the lower end of the transparency resting on the spring means, and a cap detachably secured to said remote end of the casing, said cap having mounted therein a switch, batteries and a lamp bulb, all series connected, the connections to the bulb including a mounting plate fastened to the cap and supporting the bulb, a reflector in said cap surrounding the bulb and having a quick detachable connection with said plate, and a projection on the light diffusing plate engageable with the switch to close the same on depression of the plate.

9. A transparency viewing device comprising a tubing having a lens at one end thereof, the tubing having a transverse slot on its upper side and near the end thereof remote from the lens, a light diffusing plate within said tubing at said remote end, the upper edge of which is movable in said slot, spring means below the plate reacting between the tubing and plate to project the upper edge of the plate through the slot, said slot being wide enough to accommodate a transparency with the lower end of the transparency resting on the spring means, and a cap detachably secured to said remote end of the casing, said cap having mounted therein a switch, batteries and a lamp bulb, all series connected, the connections to the bulb including a mounting plate fastened to the cap and supporting the bulb, a reflector in said cap surrounding the bulb and having a quick detachable connection with said plate, projections on the reflector engaging the batteries to retain them in the cap, and a projection on the light diffusing plate engageable with the switch to close the same on depression of the plate.

10. A transparency viewing device comprising a tubing having a lens at one end thereof, the tubing having a transverse slot on its upper side and near the end thereof remote from the lens, a light diffusing plate within said tubing at said remote end, the upper edge of which is movable in said slot, spring means below the plate reacting between the tubing and plate to project the upper edge of the plate through the slot, said slot being wide enough to accommodate a transparency with the lower end of the transparency resting on the spring means, and a cap detachably secured to said remote end of the casing, said cap having mounted therein a source of illumination, a switch for the same and a reflector for said source, with the reflector lying wholly within the boundaries of the cap, and a projection on the light diffusing plate engageable with the switch to close the same on depression of the plate.

References Cited in the file of this patent

UNITED STATES PATENTS

| | | |
|---|---|---|
| 2,349,013 | Sparling | May 16, 1944 |
| 2,649,837 | Wiese | Aug. 25, 1953 |
| 2,720,045 | Miller | Oct. 11, 1955 |
| 2,877,580 | Wiklund | Mar. 17, 1959 |